April 24, 1956    J. B. STEVENS    2,743,121
SEAL CONSTRUCTION
Filed Dec. 6, 1952
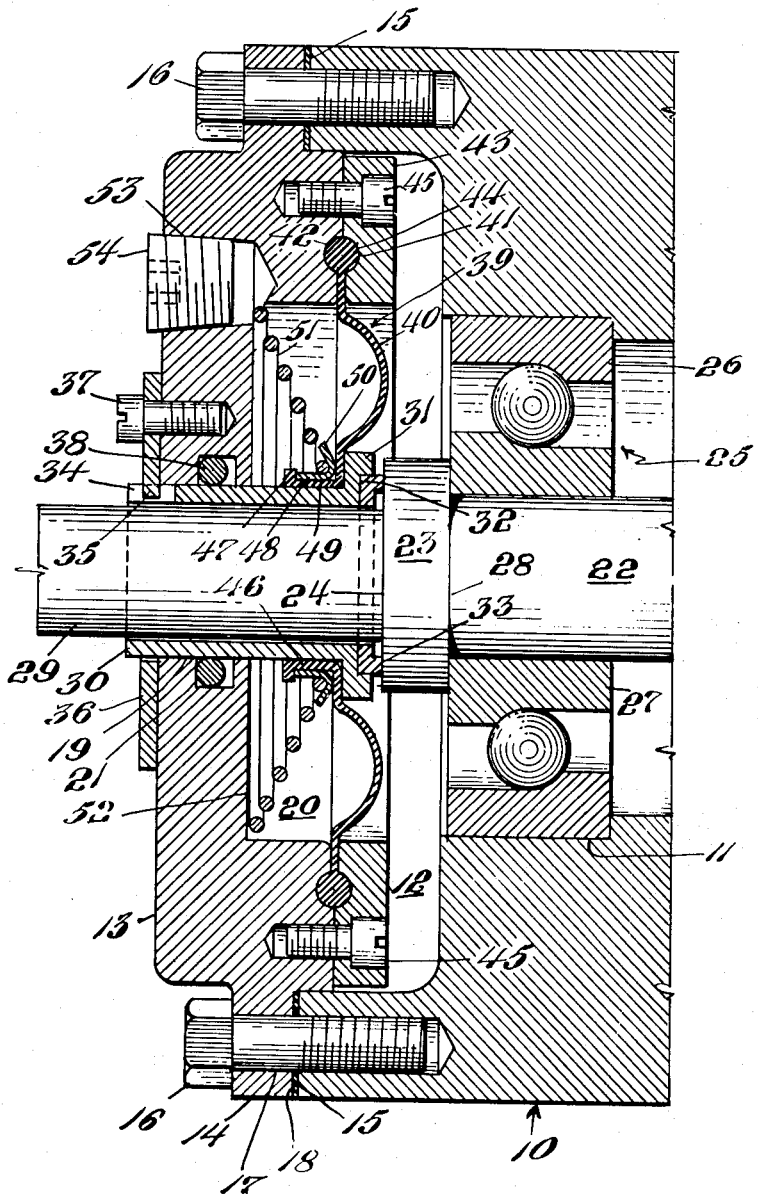
INVENTOR.
Justus B. Stevens
BY
Barlow & Barlow
ATTORNEYS.

United States Patent Office 2,743,121
Patented Apr. 24, 1956

2,743,121

SEAL CONSTRUCTION

Justus B. Stevens, East Providence, R. I., assignor to Sealol Corporation, a corporation of Rhode Island Application December 6, 1952, Serial No. 324,499

4 Claims. (Cl. 286—11)

The invention relates to a fluid pressure sealing means for sealing two relatively rotating members such as a shaft and a casing.

Seals of this character are generally provided with opposite balanced pressure applying areas which are subject to the working fluid of the apparatus which may be, by way of example, a pump. The seal is usually held against rotation with the shaft which it seals and is in turn sealed on the casing side thereof as by means of a packing or so-called O-ring. The packing or O-ring is in most instances made of a synthetic material having desirable sealing qualities but which is impractical for use when exposed to a non-compatible working fluid.

An object of the invention is to provide a fluid pressure seal so constructed as to protect the seal packing from the effects of a non-compatible working fluid.

Another object of the invention is to provide a fluid pressure seal so constructed as to provide for the seal to have opposite pressure applying areas subject to separate fluids and in which the pressure of one of said fluids will be transmitted to the other fluid so as to maintain said fluids at equal pressures.

A more specific object of the invention is to provide a fluid pressure balanced seal so constructed as to have a working fluid act on one side thereof and a separate fluid acting on the other side thereof and in which said fluids will be maintained separated by a pressure transmitting wall so that the pressure of the two fluids will be maintained equal at all pressures of the working fluid.

Another object of this invention is to provide a fluid pressure balanced seal having opposite pressure applying areas subject to the pressure of a working fluid acting directly on one of said areas and acting on the other area through a diaphragm and a separate fluid.

With these and other objects in view, the invention consists of certain novel features of construction as will be more fully described and particularly pointed out in the appended claims.

In the accompanying drawing:

The figure illustrates a central diametrical section view of a portion of an apparatus containing a working fluid and having a shaft provided with a pressure balanced sealing means embodying one form of the invention.

In the drawing 10 designates generally a casing which may be the housing of a pump containing a working fluid under pressure and having a bore 11 which opens at one end of the housing into a recess 12. A closure or end wall 13 is received in said recess 12 in snug engagement with the walls thereof and is provided with a flange 14 which abuts against the outer end 15 of the housing body and is there secured in place as by means of bolts 16 passing through suitable openings 17 in the flange and threadedly engaging the said end portion of the housing body. A gasket 18 may be provided to prevent the escape of fluid from said housing at the said flange 14. The end wall 13 is provided with a bore 19 therethrough which opens into a cavity or chamber 20 provided on the inner side of said wall 13. The wall of the bore 19 is provided with a groove 21 for a purpose which will hereinafter appear.

A shaft designated generally 22 having an annular abutment 23, one side of which provides a sealing surface 24, is journaled in a ball bearing 25, the outer race 26 of which is secured in a usual manner in the bore 11 and the inner race 27 of which is secured to the shaft 22 also in a usual manner such as by means of frictional engagement and abuts against the other side 28 of the abutment 23. A portion 29 of the said shaft 22 extends from the surface 24 to pass through the chamber 20 and out of the housing through the bore 19, which shaft may there be coupled to a prime mover for rotating said shaft.

As previously stated, the housing contains a working fluid under pressure and to prevent the escape thereof past the shaft portion 29, a sealing means which includes a sleeve 30 is provided. The sleeve has an annular flange 31 at the inner end thereof which is provided with a recess 32 in which is received a sealing ring 33 which may be urged along said shaft portion 29 with the sealing ring 33 at a position to be opposite said sealing surface 24 to engage the same. The sleeve 30 is of a length to extend beyond the end wall 13 and is provided with a slot 34 into which there extends a finger 35 carried by an annular plate 36 fastened to the end wall 13 as by means of cap screws 37, thus permitting a sliding motion of the sleeve 30 with the shaft with reference to the wall 13 but preventing rotation of said sleeve with said shaft. A packing or O-ring 38 engages the outer side of the sleeve 30 and extends into the groove 21 to engage the bottom thereof so as to prevent the passing of fluid outwardly of said chamber between the said sleeve 30 and wall of bore 19.

In the instant disclosure the O-ring 38 may be made of a synthetic material having the desired sealing qualities as previously pointed out, and the working fluid is such as to be noncompatible with the material of the seal. In order to protect the seal or O-ring 38 from the effect of the non-compatible working fluid, a movable wall designated generally 39 is provided. This wall may be of different shapes and is herein shown as being a flexible diaphragm 40 having an enlarged outer periphery as at 41 which is positioned to engage the wall of an annular recess 42 provided in the end wall 13. An annulus 43 having a recess 44 complementary to the said enlargement 41 is positioned opposite recess 42 to clamp therebetween said enlargement 41 to the end wall 13, the annulus being secured in place as by means of cap screws 45. The inner end of the diaphragm 40 is provided with a sleeve-like projection 46 having a flange 47 at the end thereof providing an annular recess 48. This sleeve-like projection 46 tightly encircles the sleeve 30 so as to have fluid sealing engagement therewith and abuts against the flange 31 thereof. A binding ring 49 is received in the recess 48 to further bind said diaphragm to said sleeve. The ring 49 is provided with an annular flange 50 against which one end of a compression spring 51 abuts, while the other end of said spring abuts against the surface 52 of the wall 13 of the chamber 20 for resiliently biasing said sleeve into engagement with said sealing surface 24. The chamber 20 is provided with an inlet 53 thereto which is completely filled by a liquid which is compatible with the O-ring seal 38, and the working fluid which occupies the chamber 12 may be either a gas or a liquid. In all cases, however, the chamber 20 will be occupied by a liquid so as to provide a more or less solid barrier to the working fluid. The shape of the diaphragm 39 as indicated at 40 will bulge outwardly and be sufficiently flexible, or possibly slightly elastic, that it will not restrict the movement of the sleeve which carries the seal 33, thus allowing sealing pressure to be unrestrictedly applied through the sleeve against the sealing face 24.

In the event that there is any leakage of the liquid from the chamber 20, such as past the threads of plug 54, the working fluid pressure will cause the diaphragm 39 to alter its shape sufficiently so as to closely follow the liquid in the chamber 20 and maintain a solid barrier liquid in this chamber by contact of the diaphragm in this changed shape against the liquid. Thus there is an opportunity for some compensation for the loss of barrier liquid which may occur when used over an extended period of time.

The pressure of the working fluid in the chamber 12 will be transferred through the diaphragm 39 to the barrier fluid in the chamber 20. Thus the fluid in both chambers will be under the same pressure and will act upon the flange 31 of the sleeve 30 so as to transmit pressure in accordance with the differential between the outer diameter of the seal 33 and the diameter of the sleeve 30. In the present instance the outer diameter of the sleeve 30 being less than the outer diameter of the seal 33 will result in the fluid tending to press the sleeve and its seal toward the sealing face 24, but it will be readily apparent that these diameters may be varied so there may be a balance of pressures acting upon the sleeve 30 through the flange 31.

From the foregoing it will be apparent that a barrier has been provided to prevent the working fluid, whether it be liquid or gas, from contacting the O-ring 38, thus making possible the use of the O-ring seal even though of a material non-compatible with the working fluid.

I claim:

1. A fluid pressure responsive seal comprising a hollow housing having an end wall, a shaft in said housing with a portion extending through said end wall and having an annular shoulder thereon within said housing, a sleeve slidably mounted on said shaft and movable into sealing engagement with said shoulder for sealing said shaft against escape of a working fluid under pressure in said housing, a packing between said end wall and sleeve for sealing said housing at the sleeve, a diaphragm deformable by fluid at different pressures on either side of it extending across said housing and attached to the walls of said housing and attached to said sleeve at a location thereon between said packing and said shoulder dividing said housing into two chambers for maintaining fluids in said chambers separated but under the same pressure, said sleeve having a radially extending flange providing a pressure applying area thereon on one side acting thereon in a direction tending to move said sleeve from sealing engagement with said shoulder, and having an opposite pressure applying area thereon subjected to fluid in said housing tending to move said sleeve into seating engagement with said shoulder.

2. A fluid responsive seal as in claim 1 wherein said diaphragm is attached to said sleeve at its juncture with said radially extending flange.

3. A fluid responsive seal as in claim 1 wherein a spring acts through said diaphragm against said flange to move said sleeve into sealing position.

4. A fluid responsive seal as in claim 1 wherein a spring acts between said end wall and sleeve to move said sleeve into sealing position.

References Cited in the file of this patent

UNITED STATES PATENTS

| | | |
|---|---|---|
| 1,598,564 | Earnshaw | Aug. 31, 1926 |
| 2,311,494 | Vedovell | Feb. 16, 1943 |
| 2,322,835 | Dornhofer | June 29, 1943 |
| 2,382,960 | Compton et al. | Aug. 21, 1945 |
| 2,392,998 | Pross | Jan. 15, 1946 |
| 2,420,557 | Mueller | May 13, 1947 |
| 2,447,930 | Biggs | Aug. 24, 1948 |
| 2,508,097 | Brown | May 16, 1950 |
| 2,558,970 | Lipfert | July 3, 1951 |
| 2,606,497 | Witherell | Aug. 12, 1952 |